United States Patent [19]
Guenther et al.

[11] Patent Number: 5,819,795
[45] Date of Patent: Oct. 13, 1998

[54] CLOSED V-SLOT FOR FLOAT CHAMBER OF BRAKE FLUID RESERVOIR

[75] Inventors: Stefan Guenther, Lake Orion; Kevin J. Gallagher, Commerce, both of Mich.

[73] Assignee: ITT Automotive Inc., Auburn Hills, Mich.

[21] Appl. No.: 712,713

[22] Filed: Sep. 12, 1996

[51] Int. Cl.$^6$ .................................................. E03B 11/00
[52] U.S. Cl. ............................................ 137/574; 60/592
[58] Field of Search .............................. 60/592; 137/574, 137/262; 340/450.1, 450.3

[56] References Cited

U.S. PATENT DOCUMENTS

| | | | |
|---|---|---|---|
| 4,066,997 | 1/1978 | Ohmi et al. | 340/450.1 |
| 4,514,980 | 5/1985 | Ishiwata | 60/534 |
| 5,041,812 | 8/1991 | Misaizu et al. | 340/450.3 |

*Primary Examiner*—Denise L. Ferensic
*Assistant Examiner*—John Ball
*Attorney, Agent, or Firm*—J. Gordon Lewis; Thomas N. Twomey

[57] ABSTRACT

A reservoir for a master cylinder including an upper reservoir section forming a portion of a float damping chamber and a lower reservoir section forming a portion of the float damping chamber. The upper reservoir section and the lower reservoir section are so dimensioned so that when they are fastened together, they define the float damping chamber at least one metering orifice formed along their mating surfaces. This metering orifice allows fluid to flow between the float damping chamber and the reservoir of the master cylinder in a controlled manner. Thus, a float device provided within the float damping chamber will not be susceptible to initiating false signals.

10 Claims, 2 Drawing Sheets

CLOSED V-SLOT FOR FLOAT CHAMBER OF BRAKE FLUID RESERVOIR

TECHNICAL FIELD

This invention relates generally to fluid reservoirs and more particularly relates to fluid reservoirs used in conjunction with braking systems.

BACKGROUND OF THE INVENTION

Many vehicle brake systems incorporate brake fluid level sensors. These systems typically include a fluid level sensor disposed in the fluid reservoir portion of the brake system. The sensing system is typically composed of a magnetic float and a magnetic sensor (such as a reed switch or a Hall effect sensor). When the fluid level within the brake fluid reservoir is reduced to a predetermined level, the magnetic float is brought in close proximity to the magnetic sensor. This causes the magnetic sensor to initiate a signal to warn the vehicle operator (by way of an indicator light on the instrument panel) that the brake fluid level within the brake reservoir is low and service should be pursued.

Now referring to FIG. 1, it is known to construct a fluid damping chamber 14 within a brake fluid reservoir 10. Chamber 14 is provided with fluid passageway 22 in its lower portion which meters the ingress and egress of fluid 12 into and out from damping chamber 14. Float 16 is positioned within chamber 14 and floats on top of fluid 12. As fluid 12 is slowly removed from fluid reservoir 10 (such as when brakes wear or when brake fluid is lost from a rupture in the hydraulic braking circuit) fluid 12 will drain from chamber 14 through passageway 22 thereby lowering the fluid level 12 within chamber 14 and lowering the position of float 16. When float 16 is lowered within a predetermined proximity of float level sensor 18, float level sensor 18 is triggered thereby initiating an electronic signal along signal wires 20.

Although fluid passageway 22 will allow fluid 12 to escape from chamber 14, it is sufficiently small such that it acts as a metering orifice and does not allow fluid 12 to quickly escape from chamber 14. Thus, for example, in certain driving conditions where the vehicle must traverse steep terrain or in high acceleration conditions which might urge the fluid to drain from chamber 14, metering orifice 22 prevents a rapid escape of fluid from chamber 14 thus preventing false triggering of the warning lamp system.

Although the prior art system FIG. 1 works satisfactorily, it is difficult and costly to fabric such a closed damping chamber as shown in FIG. 1. Specifically, in the prior art designs, chamber 14 is comprised of a integral chamber typically formed from injection molded plastic. A pin or other device is placed in the location of fluid passageway 22 and plastic is injected around it. Prior to removing fluid reservoir 10 from the plastic injection mold, the pin responsible for creating fluid passageway 22 must be retracted out of position so that the plastic part can be removed from the mold. It is well known to those skilled in the art of plastic injection molding that although the movement of pins in this way from a plastic injection mold is possible, it is highly undesirable. Retracting pins used in injection molds tend to get stuck and accordingly, tend to break with some regularity. Accordingly, they increase the cost of manufacturing such a part.

Thus, it is an object of this invention to produce a fluid reservoir having a fluid damping chamber having a fluid passageway wherein the fluid passageway is created during the plastic injection molded plastic without resorting to moveable pins or the like.

SUMMARY OF THE INVENTION

A reservoir for a master cylinder is disclosed comprising an upper reservoir section forming a portion of a brake fluid damping chamber and a lower reservoir section forming a portion of the brake fluid damping chamber. The upper and lower reservoir sections are adapted to mate along complementary surfaces wherein the mating along the complimentary surface is interrupted to form a fluid release passageway.

Preferably, the upper and the lower reservoir sections are formed from injection molded plastic.

Preferably, the complimentary surfaces are defined by either nesting concave and convex geometry's, nesting "V" geometry's, or engaging flat geometry's along the edge portion of the upper and lower sections.

DETAILED DESCRIPTION OF THE PREFERRED EMBODIMENTS

Figure 2:
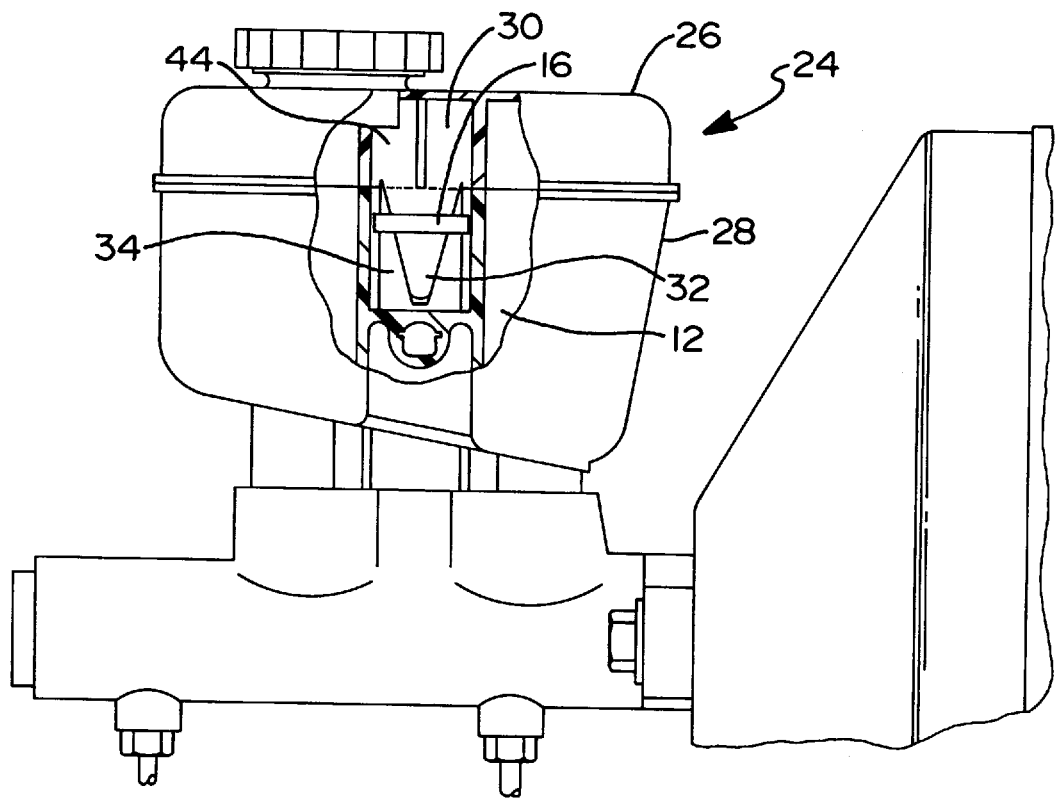
FIG. 2 is a partial cross-sectional view of the fluid reservoir of the present invention.

Now referring to FIG. 2, the fluid reservoir 24 of the present invention includes upper reservoir section 26 and lower reservoir section 28. Preferably, upper and lower reservoir sections 26, 28 are comprised of injection molded plastic.

Figure 3:
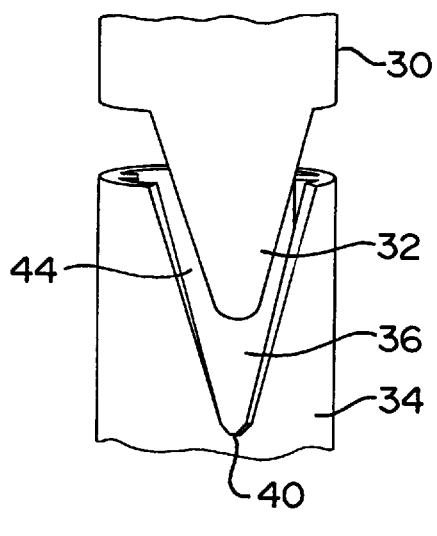
FIG. 3 is a partial exploded view of the fluid damping chamber of the fluid reservoir of the present invention.

Now referring to FIGS. 2 and 3, upper reservoir section 26 preferably includes downwardly extending member 30. Member 30 is generally circular cylindrical in shape and includes a downwardly extending finger portion 32.

Figure 4:
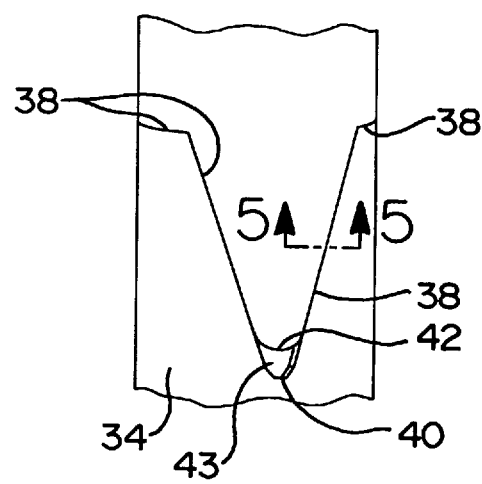
FIG. 4 is an assembled view of the fluid damping chamber of the reservoir of the present invention.

Lower reservoir section 28 includes upwardly extending member 34 which is generally circular cylindrical except for notched portion 36. Downwardly extending member 30 and upwardly extending member 28 are so dimensioned such that when they are placed together (see FIG. 4) a mating seam 38 is produced such that very little, if any fluid will flow between mating seam 38. However, the lower extreme portion 40 of notched portion 36 is sufficiently spaced apart from the lower extremity 42 of finger 32 such that a metering orifice 43 is formed through seam 38. Members 30 and 34 together form the walls defining fluid damping chamber 44.

Preferably upper reservoir section 26 and lower reservoir section 28 are injection molded as separate pieces and then fastened together by way of ultrasonic welding or the like. After fastening, metering orifice 43 is formed creating the primary means for controlling the movement of fluid between fluid damping chamber 44 and the remaining portion of the fluid reservoir.

Figure 5A:
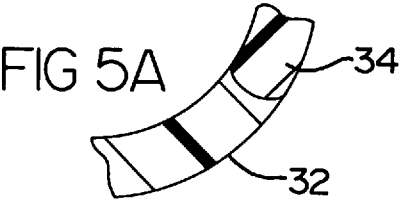
FIGS. 5A–5C are partial cross-sectional views of three embodiments the mating edge portions of the upper and lower reservoir sections of the damping chamber of the present invention.
Figure 5B:
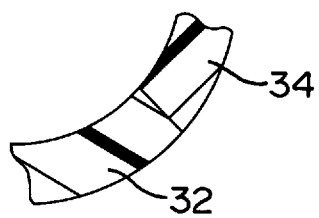
Figure 5C:
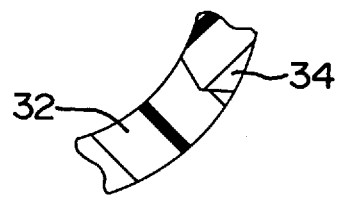

Preferably, three embodiments of the complimentary surfaces of members 30 and 34, which define the mating geometry along seam 38, include the concave/convex geometry shown in FIG. 5A, the flat geometry shown in 5B, and the nesting "V" geometry's shown in FIG. 5C.

Of course, the seal between seam 38 does not have to be fluid tight inasmuch as it is not critical if some fluid passage takes place along seam 38. However, in order for proper damping to take place, the vast majority of fluid moving between fluid reservoir 24 and chamber 44 should take place through metering orifice 43.

Figure 1:
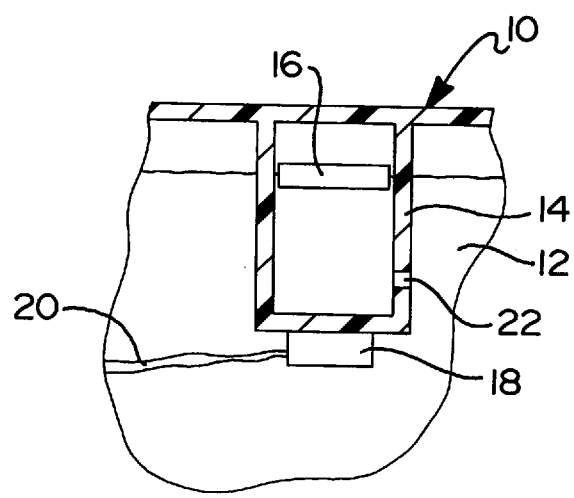
FIG. 1 is a partial cross-sectional view of a prior art fluid reservoir.

It will be readily appreciated by those skilled in the art that orifice 43 of the present invention is much easier to fabricate than orifice 22 of FIG. 1. The orifice of the present invention does not require sophisticated tooling for its fabrication nor will it suffer from the frequent tooling failure associated with the retractable apparatus necessary to form fluid passageway 22 of the prior art design.

While the foregoing description of the invention has been made with respect to the preferred embodiments, persons skilled in the art will understand, in light of the present disclosure, that numerous changes, modifications, and alternations may be made therein without departing from the spirit and the scope of the appended claims. Therefore, all such changes, modifications, and alterations are deemed to be within the scope of the invention as defined in the following claims.

What is claimed is:

1. A reservoir for a master cylinder, comprising:
    an upper reservoir section having a downwardly extending generally cylindrical member, including a downwardly extending finger, forming a first portion of a float damping chamber;
    a lower reservoir section having an upwardly extending generally cylindrical member, including a notch for receiving said finger, forming a second portion of said float damping chamber;
    wherein said upper and lower reservoir sections are adapted to join, and said first and second portions of said float damping chamber are adapted to mate along complementary surfaces, and wherein said mating of said finger and said notch is interrupted to form a fluid metering passageway between a master cylinder reservoir formed by said first and second reservoir sections and said float damping chamber formed by said first and second portions of said float damping chamber.

2. The reservoir of claim 1, wherein said first and second reservoir sections are formed from injection molded plastic.

3. The reservoir of claim 1, wherein said complementary surfaces of said first and second portions of said float damping chamber are respectively defined by nesting concave and convex geometries.

4. The reservoir of claim 1, wherein said complementary surfaces of said first and second portions of said float damping chamber are respectively defined by nesting "V" geometries.

5. The reservoir of claim 1, wherein said complementary surfaces of said first and second portions of said float damping chamber are respectively defined by flat geometries.

6. A float damping chamber for a master cylinder, comprising:
    an upper member having walls defining an upper portion of a generally cylindrical float damping chamber, said upper portion including a downwardly extending finger;
    a lower member having walls defining a lower portion of said generally cylindrical float damping chamber, said lower portion including a notch adapted to receive said downwardly extending finger;
    wherein said upper and lower members are adapted to mate along respectively associated complementary surfaces forming a seam which is resistant to fluid flow therebetween, and wherein the mating along said finger and said notch is interrupted to form a fluid metering passageway.

7. The float damping chamber of claim 6, wherein said upper and lower members are formed from injection molded plastic.

8. The float damping chamber of claim 6, wherein said respectively associated complementary surfaces are defined by nesting concave and convex geometries along the edge portions of the upper and lower members.

9. The float damping chamber of claim 6, wherein said complementary surfaces are defined by nesting "V" geometries along the edge portions of the upper and lower members.

10. The reservoir of claim 6, wherein said complementary surfaces are defined by flat geometries along the edge portions of the upper and lower members.

* * * * *